Figure 1:
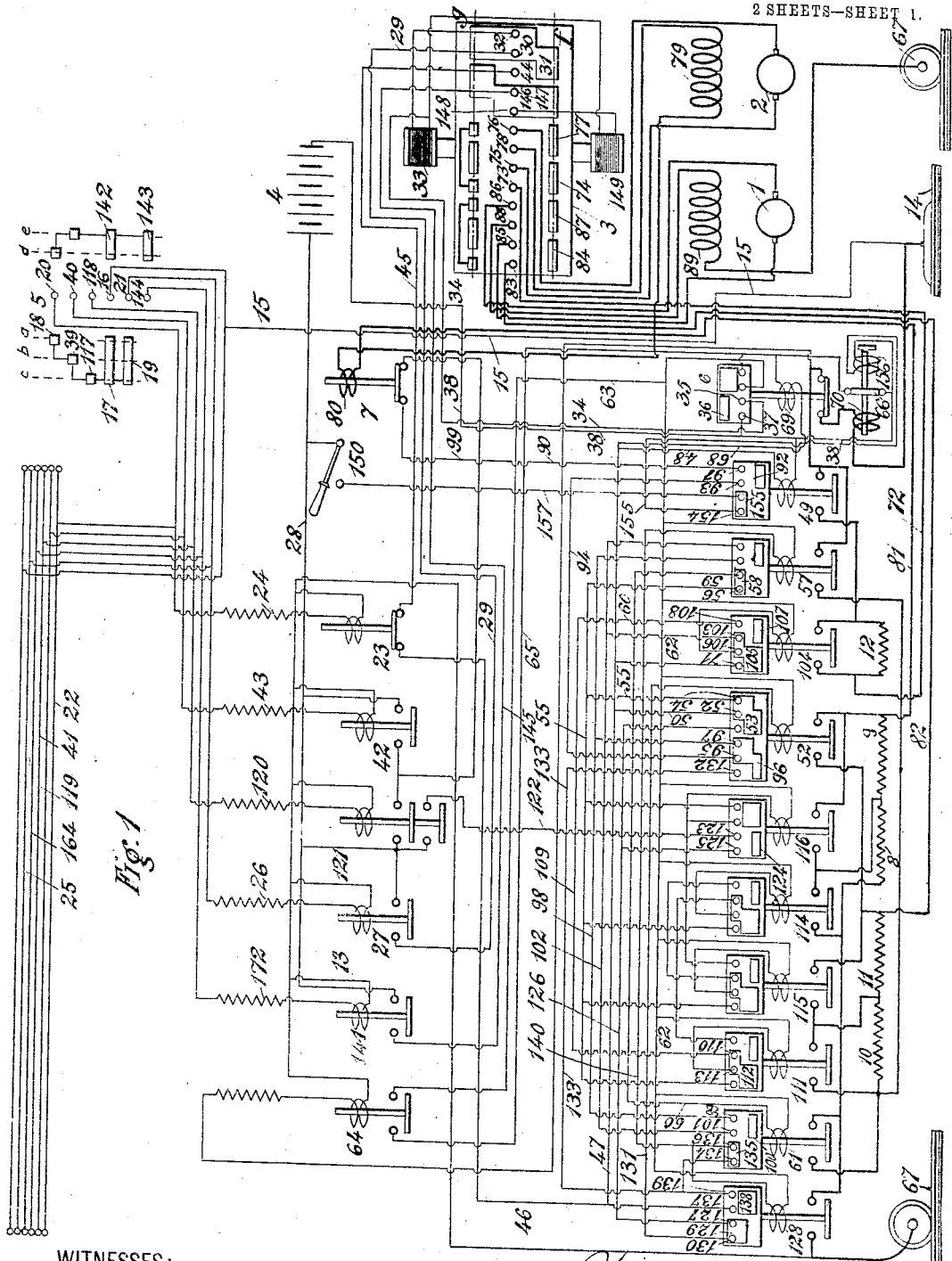

W. COOPER & O. A. SANDBORGH.
ELECTRIC MOTOR CONTROL SYSTEM.
APPLICATION FILED JAN. 3, 1906.

905,848.

Patented Dec. 8, 1908.

2 SHEETS—SHEET 1.

WITNESSES:
Camille Boulin
R. J. Dearborn

INVENTORS
William Cooper
Olof A. Sandborgh
BY
Wesley S. Carr
ATTORNEY

UNITED STATES PATENT OFFICE.

WILLIAM COOPER, OF WILKINSBURG, AND OLOF A. SANDBORGH, OF SWISSVALE, PENNSYLVANIA, ASSIGNORS TO WESTINGHOUSE ELECTRIC & MANUFACTURING COMPANY, A CORPORATION OF PENNSYLVANIA.

ELECTRIC-MOTOR-CONTROL SYSTEM.

No. 905,848.   Specification of Letters Patent.   Patented Dec. 8, 1908.

Application filed January 3, 1906. Serial No. 294,449.

*To all whom it may concern:*

Be it known that we, WILLIAM COOPER and OLOF A. SANDBORGH, citizens of the United States, and residents, respectively, of Wilkinsburg and of Swissvale, in the county of Allegheny and State of Pennsylvania, have invented a new and useful Improvement in Electric-Motor-Control Systems, of which the following is a specification.

Our invention relates to systems of electric motor control and has special reference to systems which are adapted for the control of electric vehicle motors.

The object of our invention is to provide simple and adequate means for effecting the concurrent operation of a plurality of dissimilar control systems.

Systems of electric motor control which are applied to electric vehicles and are adapted for multiple operation are often governed by groups of independent switch units which may be operated by electro-magnets directly or by electrically controlled pneumatic devices, and may be supplied with energy from the main source of motor supply or from an independent source, such as a storage battery. Another well known system of motor control which is adapted for similar service employs a rotatably mounted control drum that is operated by a pilot motor which is energized from the power circuit and controlled by a master switch and it is sometimes desirable to connect in a single train and to operate concurrently a plurality of vehicles which are severally equipped with the aforesaid or various other dissimilar control systems. For example, occasions have risen for operating cars which were equipped with the Westinghouse system of control described in Patent No. 773,832, granted to George Westinghouse, Nov. 1, 1904 in the same train with cars which were controlled by the Sprague system which is described in Patent No. 660,065, granted to F. J. Sprague, Oct. 16, 1900. In accordance with our invention, these results may be effected by the use of a group of relay switches which govern directly the control system on the vehicle to which it is applied, without being electrically connected with the control circuits which it governs. The relay switches themselves are controlled from a source of energy which is common to all vehicles of the train and it is obviously unnecessary to apply such relay arrangements to all the vehicles, since the normal operating source for the control system of one variety may be used on the other vehicles, which are applied with different systems, for the operation of the relay system located thereon.

Figure 2:
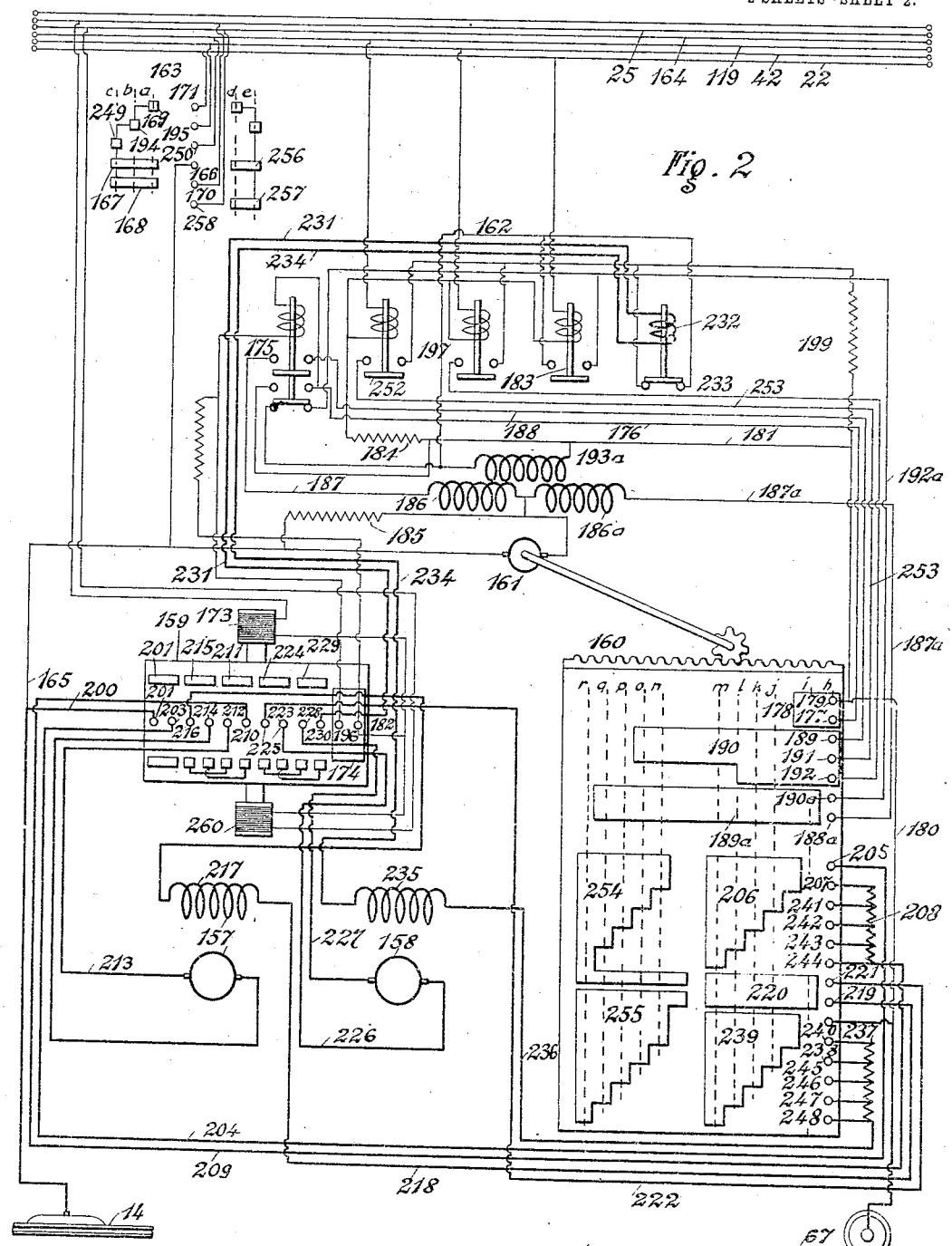

Figures 1 and 2 of the accompanying drawings are diagrammatic views of the circuit connections for the Westinghouse and the Sprague systems of control which are equipped with the relay system of our invention and are adapted for multiple operation.

Although our invention is illustrated as above stated, it is not confined to such an arrangement or to any specific control system, but its application to various other systems will be readily understood by those familiar with the art.

Referring to Fig. 1, the motor equipment and control system illustrated therein comprises, in general, electric motors 1 and 2, a reversing switch 3 therefor, a relay switch group 13 which is controlled directly from a master switch 5 and is supplied with energy from the motor supply circuit and a control system which is energized from the storage battery 4, is governed directly by the relay switch group 13 and comprises a main line interrupting switch 6, a control limiting device 7 and a plurality of electrically operated switches which determine the circuit connections to the motors 1 and 2 and the amount and arrangement of the resistance portions 8, 9, 10, 11 and 12 which may be included in circuit with the motors.

The master switch 5 is adapted to successively occupy a plurality of positions *a*, *b*, *c*, *d* and *e*, which determine the direction of rotation of the motors and whether they are to be operated in series or in multiple circuit relation. When the switch occupies the position *a*, energy is supplied from a supply line conductor 14, through conductor 15, contact finger 16, ring segments 17, 18 and 19, to contact fingers 20 and 21. Contact finger 20 is connected with a train line conductor 22 and supplies energy to a relay switch 23, through a resistance 24, the circuit being completed through the operating coil of this switch, and the opposite line conductor 67. Energy is also supplied from contact finger 21 to a train line conductor 25 and through a resistance 26 and the actuating coil of a relay switch 27, to the conductor 67. By reason of the energizing of these coils the switch 23 is opened, the switch 27 is closed and the control circuit from the positive terminal of the battery 4 is completed through a conductor 28, switch 27 and conductor 29, to a contact finger 30 of the reversing switch 3, which may occupy either of two positions $f$ and $g$. If the reversing switch occupies the position $g$, the circuit is interrupted at the switch 23, which is open, so that the reversing switch remains in this position, but if it occupies the position $f$, the circuit is continued from contact finger 30, through contact ring segment 31, finger 32, magnet coil 33 and conductor 34, to contact finger 35 of the line switch 6. If the line switch is closed, the circuit is interrupted at this point, so that the magnet 33 cannot be energized or the position of the reversing switch changed. If, however, the line switch is open, the circuit is continued from contact finger 35, through ring segment 36, contact finger 37 and conductor 38, to the negative terminal of the battery 4. Completion of this circuit throws the reversing switch 3 to the position $g$ and, at the same time, interrupts the circuit at the switch, since the contact finger 32 becomes disengaged from the segment 31.

The master switch 5 is moved to the position $b$, when the switch 23 is closed by reason of the disengagement of the contact finger 20 from the ring segment 18 and the consequent deënergizing of its actuating coil, and energy is supplied from contact finger 16, through ring segments 17 and 39 and contact finger 40, to train line conductor 41, and also through resistance 43 and the actuating coil of a switch 42, to conductor 67. The energizing of the coil closes the switch 42 and since the reversing switch 3 is in the position $g$, the circuit is continued from contact finger 30, through ring segment 31, contact finger 44, conductor 45, switch 23 and conductor 46, to the conductor 47. From this point, circuit is completed through conductor 48, the actuating magnet of a switch 49 and conductor 38, to the negative terminal of the battery 4. Circuit is also completed from the conductor 47, through conductor 50, contact finger 51 of a switch 52, ring segment 53, contact finger 54, conductor 55, contact finger 56 of the switch 57, ring segment 58, contact finger 59, conductor 60, the actuating magnet of a switch 61, conductor 62, conductor 63, relay switch 64, conductor 65, tripping switch 66 and conductor 38, to the negative terminal of the battery. A circuit is further completed from the conductor 47, through conductor 68, actuating coil 69 of the line switch 6, through the switch 66 and conductor 38, to the negative battery terminal. The energizing of the actuating magnet coils of the line switch 6 and the control switches 49 and 61 simultaneously closes these three switches, and energy is then supplied from the supply line conductor 14, through overload tripping coil 70, line switch 6, switch 49, resistance 12, conductor 72, contact finger 73 of the reversing switch 3, ring segment 74, contact finger 75, armature of motor 2, contact finger 76, ring segment 77, contact finger 78, series field 79 of the motor 2, magnet coil 80 of the limit switch 7, conductor 81, resistance portions 9 and 8, switch 61, resistance portions 10 and 11, conductor 82, contact finger 83 of the reversing switch 3, ring segment 84, contact finger 85, the armature of motor 1, contact finger 86, ring segment 87, contact finger 88 and through the series field 89 of the motor 1, to the opposite line conductor 67. Thus energy is supplied to the motors 1 and 2 which are connected in series, through the resistance portions 12, 9, 8, 10 and 11. The limit switch 7 will be opened by the energizing of the actuating magnet 80, in the usual manner, until the current traversing the motor circuit is reduced to a predetermined value by reason of the counter electromotive force generated in the motors as they increase in speed. When this value is reached, and the limit switch 7 is closed, energy is supplied from the battery 4, through conductor 28, switch 42, limit switch 7, conductor 90, contact finger 91 of the switch 49, which is now closed, ring segment 92, contact finger 93, conductor 94, contact finger 95 of the switch 52, ring segment 96, contact finger 97, conductor 98, contact finger 99 of the switch 61, which is closed, ring segment 100, contact finger 101, conductor 102, contact finger 103 of a switch 104, ring segment 105, contact finger 106, and the actuating magnet of the switch 104, to conductor 62, from which point the circuit is completed as hereinbefore described.

From the circuits described, it will be seen that the switch 104 may be closed by the energizing of its actuating coil only after the switch 61 has been closed and the current supplied to the limit switch 7 has fallen below a predetermined value. The closing of the switch 104 short-circuits the resistance portion 12, so that the total resistance in serie with the motors is decreased. As the switch is closed, current is supplied from contact finger 103 which now engages a ring segment 107, contact finger 108, conductor 109, contact finger 110 of a switch 111, ring segment 112, contact finger 113 and the actuating coil of the switch 111, to conductor 62, which is connected to the negative battery terminal. In this way, the switch 111 is closed, and short-circuits resistance portion 10. As the switch 104 is closed, its actuating coil is energized from conductor 47, the circuit being then completed through contact fingers 71, ring segment 105, contact finger 106 and the actuating coil, to conductor 62, and switch 111 is similarly held closed by energy which is now supplied from conductor 55, through ring segment 112, contact finger 113 and its actuating magnet, to the conductor 62. When the switch 111 is closed, energy is then supplied to a switch 114 in a similar manner, which closes the switch 115 and which, in turn, closes a switch 116. The switches 114, 115 and 116 short-circuit, respectively, resistance portions 8, 11 and 9, so that the motors 1 and 2 are now connected in series directly across the line, without resistance in circuit therewith, and as each switch is closed, it will be observed that its actuating coil is transferred, so that it receives its energy from a line which is independent of the limit switch 7. In this way, as each resistance portion is cut out, the limit switch may be opened and thus prevent closing of the next switch without opening any of the switches which have already been closed, so that no portion of the resistance is short-circuited while the current energy supplied to the motors exceeds a certain predetermined value.

If the master switch 5 is now moved to the position c, contact finger 40 becomes disengaged from the ring segment 39, which opens the switch 42, and energy is supplied from contact finger 16, through ring segments 17 and 117, and contact finger 118, to a train line conductor 119 and through resistance 120 and the actuating coil of a relay switch 121, to the conductor 67. The energizing of the said actuating coil closes the switch 121, which completes a circuit through the limit switch 7 and conductor 90, as hereinbefore explained, and also completes a circuit from conductor 28, through switch 121, conductor 122, contact finger 123 of the switch 116, which is now closed, ring segment 124, contact finger 125, conductor 126, contact finger 127 of a switch 128, ring segment 129, contact finger 130, conductor 131 and through actuating coil of the switch 52, to the negative conductor 62. In this way, switch 52 is closed, which completes a connection in multiple with the resistance portions 10, 11, 8 and 9.

When the switch 52 closes, contact finger 54 is disengaged from the ring segment 53, so that the conductor 55 becomes deënergized, and since the switches 61, 111, 115, 114 and 116 are retained in closed position by energy received therefrom, they are now opened. Furthermore, a circuit is completed through limit switch 7, conductor 90, conductor 94, contact finger 95 of the switch 52, ring segment 96, contact finger 132, conductor 133, contact finger 134 of the switch 61, which is open, ring segment 135, contact finger 136, through the actuating coil of the switch 128, to the negative conductor 62. The energizing of the said actuating coil closes switch 128, which connects one end of the resistance portion 8—9 to line conductor 67, the other end being connected, as before, through the limit switch coil and the field magnet winding, to the armature of the motor 2, as soon as the current flown through the motors, which are now connected in series without any resistance in the circuit, falls below a predetermined value. When the switch 128 is closed, contact fingers 127 and 130 are disengaged from the ring segment 129, so that circuit through the retaining coil of the switch 52 is interrupted and this switch opened, and a circuit is completed directly from conductor 46, through a contact finger 137, ring segment 138, contact fingers 139 and 134, ring segment 135, contact finger 136, conductor 140, and through actuating coil of the switch 57, to the negative conductor 62. The energizing of this coil closes the switch 57. Motor circuit connections are now completed from the positive line terminal 14, through the line switch 6, switch 49, switch 104, conductor 72, motor 2, limit switch 7, resistance portions 8 and 9 and the switch 128, to line conductor 67. A circuit is also completed from the line switch 6 through switch 57, resistance 10,—11, conductor 82 and the motor 1, to line conductor 67. Closing of the switch 49 again energizes the actuating coil of the switch 111, as soon as the limit switch 7 has been closed, and serves to simultaneously energize the actuating coils of the switches 111 and 114, so that resistance portions 8 and 10 are short-circuited. When the limit switch has closed after the increased flow of current occasioned by this reduction in resistance has subsided, the switches 115 and 116 are similarly closed and the resistance portions 11 and 9 are short-circuited. This is accomplished in a manner similar to that already explained for the consecutive action of the switches when the motors are connected in series, so that I deem it unnecessary to describe the circuit connections in detail. When the resistance portions are all short-circuited, the motors being connected in multiple circuit, the full running position for the equipment is reached.

If it is desirable to operate the motors in the reverse direction of rotation, the master switch 5 may be thrown to the "off" position and then moved through the positions d and e consecutively, which provide for starting the motors with all resistance in series, gradually reducing this resistance and operating the motors without resistance in series. The reversal of the motor connections is accomplished by energizing relay switch 141 instead of the switch 27, since a circuit is completed when the switch 5 occupies positions d and e from the contact finger 16, through ring segments 142 and 143, and contact finger 144 to train line conductor 164 and through a resistance 172 and the actuating coil of the switch 141 to the conductor 67. When the switch 141 is closed, energy is supplied from conductor 28, through switch 141, conductor 145, contact finger 146, ring segment 147, contact finger 148, through actuating magnet 149 of the reversing switch 3, to conductor 34. From this point, circuit is completed to the negative battery terminal, as already described. The energizing of the coil 149 throws the reversing switch 3 to the position $f$, but this cannot take place unless the line switch 6 is open, according to the circuit arrangement described for the coil 33.

The overload coil 70 of the line switch 6 is so constructed that the currents traversing the motor circuits shall not exceed predetermined limits, since the energizing of this coil opens the circuit of the operating magnet 69, which is completed through the tripping switch 66. When the line switch has been tripped in this manner, it is necessary to return the master switch from any position to either the "off" position or the first starting positions $a$ or $d$, since the line switch may be re-set only by a switch 150 which completes the circuit from the positive terminal of the battery 4, through conductor 151, contact finger 152, ring segment 153, contact finger 154, conductor 155 and re-setting coil 156, to conductor 38, which is connected to the negative battery terminal. Thus, it is readily seen that the switch 49 must be open before the line switch may again be closed.

The controlling magnet of the switch 64 is energized directly from the motor supply circuit and is so arranged as to be closed at all times when the line switch 6 is closed and is deënergized and open when the line switch is open.

It follows from the conditions just stated that the relay switch 64 is normally closed at all times unless the supply of energy from the line conductor 14 is broken, in which case switch 64 immediately opens and interrupts the return circuit for all retaining coils of the control switch group except the line switch. When a vehicle is in operation, its supply of power is sometimes inadvertently cut off, and if the control switches should continue to occupy the positions which they held at the time energy was discontinued, considerable damage would occur to the motors when energy was again supplied. In such cases the switch 64 opens all the control switches and it is necessary to return the master controller 5 to its starting position when the equipment may be again started in the normal manner.

Referring to Fig. 2, the equipment illustrated therein comprises, in general, motors 157 and 158, a reversing switch 159 and an electric motor-driven controller 160 that is adapted to occupy a plurality of positions $h$, $i$, $j$, $k$, $l$, $m$, $n$, $o$, $p$, $q$ and $r$, the relation of which is determined by an auxiliary or pilot motor 161. The motor 161 is electrically controlled by a switch group 162 that comprises a plurality of independently operated switches and a master switch 163, which is similar to the master switch 5 of Fig. 1, occupying positions $a$, $b$, $c$, $d$ and $e$.

When the controller 163 occupies the position $a$, energy is supplied from the motor supply line conductor 14, through conductor 165, contact finger 166, ring segments 167, 168 and 169, to contact fingers 170 and 171. Energy is supplied from contact finger 170, through train line conductor 25, magnet coil 173 of the reversing switch 159, contact finger 182, ring segment 174, contact finger 196, the actuating coil of a switch 175, conductor 176, contact finger 177 of the controller 160, ring segment 178, contact finger 179 and conductor 180, to the line conductor 67. The ring segment 178 is so arranged with respect to the controller 160 that circuit is completed between contact fingers 177 and 179 only when the controller occupies either the "off" position $h$ or the first starting position $i$.

When the master controller 163 is first moved to the position $a$, if the controller 160 occupies any position other than $h$ or $i$, a circuit may not be completed through the actuating coils of the reversing switch 159 and switch 175 may not be closed. If this is the case, energy is supplied from conductor 165 to the armature of the pilot motor 161, a circuit being completed through field magnet winding 186$^a$, conductor 187$^a$, contact finger 188$^a$, ring segment 189$^a$, contact finger 190$^a$, conductor 192$^a$, switch 175, which is in an open position, field winding 193$^a$, conductors 181 and 180, to line conductor 67. After these connections are completed the motor 161 returns the controller 160 to the position $h$, when it is brought to rest by reason of the disengagement of the contact fingers 188$^a$ and 190$^a$ from the ring segment 189$^a$.

When the controller 160 occupies position $h$, a circuit is completed, as already described, and the reversing switch 159 is moved to a position $x$ by the energizing of the magnet coil 173. Furthermore, the switch 175 is closed by the energizing of its actuating coil and circuit is thereupon completed through the switch 175 and through the conductors 181 and 180, to ground, so that the switch 175 is held closed, irrespective of the position of controller 160. Circuit is also completed from the contact finger 171, through train line conductor 22, the actuating coil of the switch 183, resistance 184, conductors 181 and 180, to line conductor 67 so that the switch 183 is closed. When the vehicle is in operation, and the controller 160 occupies any position other than the position $h$, and if the operator wishes to allow it to coast, the master switch is returned to the position $a$ and although the switch 175 is still closed and the reversing switch 159 retained in the same position, the closing of the switch 183 provides for the return of the controller 160 to the "off" position $h$, pilot motor connections being completed from conductor 165 through the pilot motor armature, field magnet winding $186^a$, conductor $187^a$, contact finger $188^a$, ring segment $189^a$, contact finger $190^a$, conductor $192^a$, switch 183, field magnet winding $193^a$, conductors 181 and 180 to the line conductor 67. If the controller 163 is moved to the position $b$, circuit is completed from contact finger 166, through ring segments 167 and 194, finger 195, train line conductor 41, through actuating coil of the switch 197 and resistance 184, and conductors 181 and 180 to line conductor 67, so that the switch 197 is closed. Circuit is further completed from the conductor 165, through the armature of the motor 161 and resistance 185 in multiple, a portion 186 of the field magnet winding of the motor 161, conductor 187, switch 175, conductor 188, contact finger 189, and ring segment 190, to contact fingers 191 and 192. Assuming that the controller 160 is in the "off" position $h$, circuit is completed from the contact finger 192, through conductor 193, switch 197, resistance 199 and conductor 180, to line conductor 67. Consequently, the motor 161 is operated and serves to move the controller 160 consecutively through positions $i, j, k, l$ and $m$.

When the controller 160 occupies the position $i$, circuit is completed from the main line conductor 14 through conductor 200, contact finger 201, ring segment 202, contact finger 203, conductor 204, contact finger 205, ring segment 206, contact finger 207, resistance 208, conductor 209, contact finger 210, ring segment 211, finger 212, conductor 213, the armature of motor 157, finger 214, ring segment 215, finger 216, field magnet winding 217 of the motor 157, conductor 218, contact finger 219, ring segment 220, contact finger 221, conductor 222, contact finger 223, ring segment 224, finger 225, conductor 226, the armature of motor 158, contact finger 228, ring segment 229, finger 230, conductor 231, actuating magnet 232 of a switch 233, conductor 234, field magnet winding 235 of the motor 158, conductor 236, resistance 237, contact finger 238, ring segment 239, contact finger 240 and conductor 180, to line conductor 67.

As the controller 160 is moved consecutively through the positions $j, k, l$ and $m$, the ring segments 206 and 239 are consecutively engaged respectively by contact fingers 241, 242, 243 and 244 and 245, 246, 247 and 248, which are connected to various intermediate points in the resistances 208 and 237, thereby gradually reducing said resistances, which, as hereinbefore described, are connected in series with the motors 157 and 158. If the master controller 163 is retained in this position $b$, the pilot motor 161 will be brought to rest, since contact finger 192 is disengaged from the ring segment 190 at this point. If the master switch 163 is now moved to position $c$, circuit is completed from the contact finger 166, through ring segments 167 and 249, contact finger 250, train line conductor 119, through the actuating coil of a switch 252, resistance 184, and conductors 181 and 180 to line conductor 67. As this switch is closed, the circuit is completed from contact finger 189 of the controller 160, through contact ring segment 190, contact finger 191, conductor 253, switch 252, resistance 199 and conductors 181 and 180, to line conductor 67. In this way, the connections for the motor 161 are again completed, which serves to operate the controller 160 consecutively through the positions $n, o, p, q$ and $r$.

As the controller 160 passes from the position $m$ to the position $n$, circuit connections for the motors 157 and 158 are changed from series relation to multiple circuit relation, energy being supplied from the conductor 14, through contact finger 201, ring segment 202, contact finger 203, conductor 204, and contact finger 205, to the ring segment 254. From this point, circuit connections are completed through contact fingers 207, resistance 208, conductor 209, contact finger 210, ring segment 211, contact finger 212, conductor 213, the armature of motor 157, contact finger 214, ring segment 215, contact finger 216, field magnet winding 217, conductor 218, contact finger 219, contact ring segment 255 and contact finger 240, to line conductor 67; a circuit also being completed from ring segment 254, through contact finger 221, conductor 222, contact finger 223, ring segment 224, contact finger 225, conductor 226, the armature of motor 158, conductor 227, contact finger 228, ring segment 229, contact finger 230, conductor 231, magnet winding 232 of a switch 233, conductor 234, field magnet winding 235, conductor 236, resistance 237, contact finger 238, ring segment 239 and finger 240 to line conductor 67. In this way, the two motors are connected in multiple, the resistance 208 being in series with one and the resistance 237 in series with the other. As the controller 160 now passes consecutively through the positions $n, o, p, q$ and $r$, the resistance in circuit with each motor is simultaneously reduced until both motors are connected in multiple across the circuit directly. When the controller 160 reaches the position $r$, its driving motor 161 is brought to rest, since the contact fingers $190^a$ and $188^a$ become disengaged from the ring segment $189^a$ at this point.

In order to operate the motor-equipment in the reverse direction, the controller 163 may be moved to the position $d$, in which position energy is supplied from contact finger 166, through ring segments 256 and 257, contact finger 258, train line conductor 164, actuating coil 260 of the reversing switch 159, to contact finger 182, from which point the circuit is completed as hereinbefore described.

In order to operate the equipments illustrated in Figs. 1 and 2 in one train by a single master controller, train lines 25, 164, 119, 41 and 22, shown in both figures, may be respectively interconnected. When this is done, both equipments may be simultaneously controlled by the action of either master switch 5 or master switch 163, since in either case energy is supplied to the train line conductors which would be similarly energized if either equipment operated alone. For example, assuming that the aforesaid train line conductors are connected and that master controller 163 is moved to the position $a$, energy is then supplied, as hereinbefore explained, to contact fingers 170 and 171, which supply energy through the train line conductors to the conductors which are connected with contact fingers 20 and 21 of master switch 5. Thus energy is supplied to the control system of Fig. 1 by the action of the master switch 163, the master switch 5 remaining in its "off" position.

We claim as our invention:

1. The combination with a plurality of dissimilar electric motor control systems, of means for effecting the concurrent operation of said systems.

2. The combination with a plurality of dissimilar electrically operated vehicle motor control systems, of means for effecting the concurrent operation of said systems.

3. The combination with a plurality of dissimilar electrically operated vehicle motor control systems which are supplied with electric energy from different voltage sources, of means for effecting the concurrent operation of said systems.

4. The combination with a plurality of similar electric vehicle motor equipments and a plurality of electrically operated vehicle motor control systems which are supplied with energy from sources of unlike voltage, of means for effecting the concurrent operation of said systems.

5. The combination with a plurality of similar electric vehicle motor equipments and a plurality of electrically operated vehicle motor control systems which are supplied with energy from sources of unlike voltage, of electrically operated means for effecting the simultaneous operation of said systems.

6. The combination with a plurality of similar electric vehicle motor equipments and a plurality of electrically operated vehicle motor control systems which are supplied with energy from sources of unlike voltage, of electrically operated means for effecting the simultaneous operation of said systems through a single manually operated master switch.

7. The combination with a plurality of similar electric vehicle motor equipments and a plurality of electrically operated vehicle motor control systems which are supplied with energy from sources of unlike voltage, of electrically operated means for effecting the simultaneous operation of said systems said means having no electrical connection with the direct controlling means.

8. The combination with a plurality of electric vehicle motor equipments, a corresponding number of auxiliary control systems therefor comprising a series of independent switches the operation of which is electrically governed and sources of unlike voltage for said switches, of means for effecting the simultaneous operation of said switches.

9. The combination with a plurality of electric vehicle motor equipments, a corresponding number of auxiliary control systems therefor comprising a series of independent switches the operation of which is electrically governed and sources of unlike voltage for the several switches, of means for effecting the simultaneous operation of said switches through a single master switch.

10. The combination with a plurality of electric vehicle motor equipments, a corresponding number of auxiliary control systems therefor comprising a series of independent switches the operation of which is electrically governed and sources of unlike voltage for the several switches, of means for effecting the simultaneous operation of said switches, said means comprising a manually operated governor and a plurality of relay switches which are interposed between the circuits in which the manually operated governor is located and the switches which are supplied with energy at a different voltage.

11. The combination with a plurality of electric motor control systems, of which part are energized from the motor supply circuit and the remainder are energized from an independent source, of means for effecting the simultaneous operation of the systems.

12. The combination with a system of electric motor control comprising a plurality of electrically operated switches which are energized from an independent source, and a second system of electric motor control comprising a rotatably mounted drum switch and a relatively small electric driving motor therefor which is energized from the power motor supply circuit, of means for effecting the simultaneous operation of the two systems.

13. The combination with a plurality of translating devices and an auxiliary electric control system therefor which is energized from a separate source of electric current, of devices for electrically controlling the auxiliary system which are governed by a manually-operated master switch and are supplied with energy from the motor supply circuit without electrical connection to the auxiliary system.

14. The combination with a system of electric motor control comprising a plurality of electrically operated switches which are actuated from an independent source of electrical energy, and a second system comprising an electrically governed system of control which is energized from the motor supply line, of means for effecting the simultaneous operation of said control systems.

15. The combination with a plurality of systems of control for electric motors, each comprising electrically actuated devices for arranging the motor circuits, the auxiliary circuits of one of the systems deriving energy from one of the motor circuits, and a storage battery from which the auxiliary circuits of the other system are supplied, of electrically actuated means that derive energy from the motor circuits for governing the electrically actuated devices of the latter system whereby the systems may be caused to operate concurrently.

16. The combination with a plurality of electric motors, an electrically actuated device for arranging the motor circuits that is supplied with energy from said circuits, and a plurality of independently electrically actuated devices for arranging the circuits of certain others of the motors, of a master switch and electrically actuated means for governing the operation of said independently actuated devices that are supplied with energy from the motor circuits whereby all of the motors may be caused to operate concurrently.

In testimony whereof, we have hereunto subscribed our names this 30th day of December, 1905.

WILLIAM COOPER.
OLOF A. SANDBORGH.

Witnesses.
R. J. DEARBORN,
BIRNEY HINES.